US008588490B2

(12) United States Patent
Mizuno (10) Patent No.: US 8,588,490 B2
(45) Date of Patent: Nov. 19, 2013

(54) IMAGE-BASED DIAGNOSIS ASSISTANCE APPARATUS, ITS OPERATION METHOD AND PROGRAM (75) Inventor: Osamu Mizuno, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 13/409,901

(22) Filed: Mar. 1, 2012

(65) Prior Publication Data
US 2012/0224752 A1 Sep. 6, 2012

(30) Foreign Application Priority Data
Mar. 2, 2011 (JP) ................................ 2011-044661

(51) Int. Cl.
G06K 9/00 (2006.01)
A61B 6/00 (2006.01)

(52) U.S. Cl.
USPC ................................ 382/128; 382/171; 378/4

(58) Field of Classification Search
USPC ......... 382/100, 103, 106–107, 128–134, 154, 382/155, 162, 168, 171, 173, 181, 199, 201, 382/224, 232, 254, 274, 276, 285, 305; 703/2; 433/24; 351/205; 378/21, 4
See application file for complete search history.

(56) References Cited

U.S. PATENT DOCUMENTS

| 4,838,679 A * | 6/1989 | Bille ............................. 351/205 |
| 6,371,761 B1 * | 4/2002 | Cheang et al. .................. 433/24 |
| 7,529,396 B2 * | 5/2009 | Matsumoto .................... 382/128 |
| 7,620,528 B2 * | 11/2009 | Kato et al. ......................... 703/2 |
| 8,208,688 B2 * | 6/2012 | Everett et al. ................. 382/106 |
| 2006/0181551 A1 | 8/2006 | Matsumoto |

FOREIGN PATENT DOCUMENTS

| JP | 2006187531 A | 7/2006 |
| JP | 2010194100 A | 9/2010 |

OTHER PUBLICATIONS

Image Processing for Underwater Measurement of Salmon Biomass; D. Chan, et al. Mar. 25, 1998 pp. 12/1-12/6; XP006503528; Section 3.2.1.
European Search Report EP Application No. 12 15 7800; May 14, 2012.
Decision of Grant dated Jan. 22, 2013, issued in corresponding Japanese Patent Application No. 2011-044661.
Denis Zorin, et al., "Interpolating Subdivision for Meshes with Arbitrary Topology", SIGGRAPH '96 Proceedings of the 23rd annual conference on Computer graphics and interactive techniques, 1996, 4 pages.

* cited by examiner

Primary Examiner — Seyed Azarian
(74) Attorney, Agent, or Firm — Sughrue Mion, PLLC (57) ABSTRACT Plural points present on a boundary surface dividing a subject are set as input points. A plane approximating the boundary surface is determined as a reference plane by using the input points. Plural supplementary points are set on the reference plane on the outside of the subject. A surface approximating the boundary surface is generated by interpolating points between the input points by using the supplementary points and the input points. The subject is divided into separate regions by using the generated surface as a boundary surface.

10 Claims, 6 Drawing Sheets

41 — INPUT POINT CORRECTING MEANS — 31

IMAGE-BASED DIAGNOSIS ASSISTANCE APPARATUS, ITS OPERATION METHOD AND PROGRAM

BACKGROUND OF THE INVENTION

1. Field of the Invention

The present invention relates to detection processing performed on a three-dimensional image, and particularly to an apparatus, method and program related to detection of a boundary surface in a three-dimensional medical image.

2. Description of the Related Art

In recent years, three-dimensional medical images (voxel data) obtained by various modalities, such as CT (Computed Tomography) and MR (Magnetic Resonance), are used in diagnosis for medical treatment. The voxel data are three-dimensional data composed of many voxels, and contain a large amount of information. However, it is not easy to extract information that is necessary for diagnosis from the large amount of information. Therefore, actual diagnosis is performed after a target region of diagnosis is extracted from the voxel data by using an imaging processing apparatus, and various kinds of image processing are performed on the extracted region.

For example, when a blood vessel on a surface of an organ, such as a heart, is a target of diagnosis, a surface representing the surface of the organ is extracted, and a region having a certain thickness with respect to the surface is set as a region of interest. Further, MIF (maximum intensity projection) processing is performed on the region of interest to generate an image in which only the blood vessel is extracted, and the generated image is used to perform diagnosis on the blood vessel.

As a method for extracting an organ, as described above, a technique in which the positions of arbitrary points in voxel data are three-dimensionally specified, and a surface including the specified points is extracted by connecting the specified points to each other has been proposed. In U.S. Patent Application Publication No. 20060181551 (Patent Document 1), first, plural are specified on a surface of an organ present in voxel data. A spherical surface circumscribing the plural specified points is assumed, and the center of gravity of the circumscribed spherical surface is assumed to be a light source. Further, each of the plural specified points is projected from the light source onto the circumscribed spherical surface to obtain projection points of the specified points. A connection relationship of sides, each connecting the projection points to each other, is obtained by two-dimensional Delaunay triangulation (Delaunay 2D), and the connection relationship between the projected specified points is applied to a connection relationship of the original specified points on the surface of the organ to define a surface. In this manner, it is possible to extract the shape of the surface of the organ.

The technique disclosed in Patent Document 1 may be appropriate to extract a structure, such as a surface of an organ, which is composed of a closed surface. However, the technique disclosed in Patent Document 1 is not appropriate to extract a surface-shaped structure, such a boundary surface. For example, the technique is not appropriate to extract a boundary surface, such as a diaphragm, which divides a lung field and an abdomen from each other, a boundary surface dividing a lung or a liver into plural segments, and a boundary surface dividing a heart into left/right atria and left/right ventricles.

For accurate recognition of the position of a lesion, it is necessary to judge the position of the lesion in each tissue by observing the position of a diaphragm or a boundary surface of the tissue. Therefore, it is essential to recognize the boundary surface of each tissue in the voxel data.

SUMMARY OF THE INVENTION

In view of the foregoing circumstances, it is an object of the present invention to provide an image-based diagnosis assistance apparatus for assisting doctors or the like in interpreting medical images for diagnosis by extracting a boundary surface, and an operation method of the apparatus, and an image-based diagnosis assistance program.

An image-based diagnosis assistance apparatus of the present invention is an image-based diagnosis assistance apparatus comprising:

an input point setting means that sets, as input points, a plurality of points present on a boundary surface dividing a predetermined subject in volume data obtained by imaging the predetermined subject;

a reference plane determining means that determines, as a reference plane, a plane approximating the boundary surface by using the plurality of input points;

a surface generating means that generates a surface approximating the boundary surface by setting a plurality of supplementary points on the reference plane on the outside of the predetermined subject, and by interpolating points between the input points by using the plurality of supplementary points and the input points; and a region dividing means that divides the predetermined subject into separate regions by using the generated surface as a boundary surface.

An operation method of an image-based diagnosis apparatus of the present invention is an operation method of an image-based diagnosis assistance apparatus that includes:

an input point setting means that sets input points in volume data obtained by imaging a predetermined subject;

a reference plane determining means that determines a reference plane;

a surface generating means that generates a surface by interpolating points between the input points; and a region dividing means that divides the predetermined subject into a plurality of regions, the method comprising:

an input point setting step of setting, by the input point setting means, a plurality of points present on a boundary surface dividing the predetermined subject in the volume data, as the input points;

a reference plane determining step of determining, by the reference plane determining means, a plane approximating the boundary surface by using the plurality of input points, as the reference plane;

a surface generating step of generating, by the surface generating means, the surface that approximates the boundary surface by setting a plurality of supplementary points on the reference plane on the outside of the predetermined subject, and by interpolating points between the input points by using the plurality of supplementary points and the input points; and a region dividing step of dividing, by the region dividing means, the predetermined subject into the plurality of separate regions by using the generated surface as a boundary surface.

An image-based diagnosis assistance program of the present invention causes a computer to function as the aforementioned image-based diagnosis assistance apparatus.

In the present invention, specific examples of the "subject" are a whole body of a human being or an animal, and a specific region, such as a thoracoabdominal region, or an organ, such as a lung, a liver and a heart, of a human being or an animal, and the like.

Further, examples of the "boundary surface" are a diaphragm, which divides the thoracoabdominal region, and a boundary surface dividing a lung into plural segments (a boundary surface dividing a right lung into a superior lobe, a middle lobe, and an inferior lobe, a boundary surface dividing a left lung into a superior lobe and an inferior lobe, and the like). Other examples of the "boundary surface" are a boundary surface dividing a liver into plural segments (a boundary surface dividing the whole liver into a right lobe and a left lobe, a boundary surface dividing the right lobe of the liver into an anterior segment and a posterior segment, a boundary surface dividing the right lobe of the liver into an upper segment and a lower segment, and the like), and a boundary surface dividing a heart into left/right atria and left/right ventricles, and the like.

The term "interpolate" means inserting, based on the tendency of the whole numerical values, a numerical value estimated to be present between numerical values that are apart from each other. Further, the expression "generates a surface by interpolating points between the input points" means generating a surface to smoothly connect the coordinate values of the input points that are apart from each other. Further, the generated surface may be a surface that passes through an input point or points. Alternatively, the generated surface may be a surface that does not pass through any input point, but extends along a change in the whole input points.

Further, the reference plane determining means may determine, as the reference plane, a regression plane with respect to the input points.

Specifically, the surface generating means may generate the surface by interpolating points between the input points by Delaunay triangulation using the supplementary points and the input points.

Further, the surface generating means may generate the surface by determining sides (segments), each connecting projection points obtained by projecting the input points onto the reference plane, by using two-dimensional Delaunay triangulation with respect to the projection points, and by determining sides, each connecting the input points (input points before projection), by applying, to the input points, a connection relationship of the sides connecting the projection points.

Further, an instruction input receiving means that receives an input of instruction specifying a predetermined position in the volume data may be further provided. It is desirable that the input point setting means sets, as one of the input points, a point present on the boundary surface by detecting the point based on the gradient of luminance or density in the vicinity of the predetermined position specified by the input of instruction.

Further, the reference plane determining means may include a first candidate plane obtaining means that obtains, based on the input points, a plurality of candidate planes as candidates for the reference plane, and a first candidate plane displaying means that displays the plurality of candidate planes on a display device, and a candidate plane selection input receiving means that receives an input of a candidate plane selected from the displayed plurality of candidate planes. Further, the reference plane determining means may determine, as the reference plane, the selected candidate plane.

Alternatively, the reference plane determining means may include a second candidate plane obtaining means that obtains, based on the input points, a candidate plane as a candidate for the reference plane, and a second candidate plane displaying means that displays the candidate plane on a display device, and a candidate plane direction change input receiving means that receives an input of change in the direction of the displayed candidate plane. Further, the reference plane determining means may determine, as the reference plane, the candidate plane the direction of which has been changed.

The volume data may represent a medical image.

According to the present invention, points on a boundary surface dividing a subject in volume data are set as input points. Further, a plane approximating the boundary surface is determined as a reference plane. Plural supplementary points are set on the reference plane on the outside of the subject, and a surface approximating the boundary surface is generated by using the supplementary points and the input points. Therefore, it is possible to define a surface-shaped boundary surface, such as a boundary surface (a diaphragm, or the like) and a boundary surface of tissue dividing a lung, a liver or a heart into plural segments, in such a manner that the boundary surface extends to the outside of the subject. Volume data are a set of simple voxels, and do not include information about a boundary surface. Therefore, the subject may be divided into two regions by the generated surface, and that can assist doctors or the like in various kinds of image-based diagnosis, such as accurate recognition of the position of a tumor or the like.

When a regression plane with respect to the input points is determined as the reference plane, it is possible to determine the reference plane inclining in a direction close to the anatomical inclination of the boundary surface.

When Delaunay triangulation is performed by using the supplementary points and the input points, it is possible to determine a connection relationship between the input points and the supplementary points. Further, when a surface is generated based on the connection relationship, it is possible to obtain a surface approximating the boundary surface.

Further, when a connection relationship is obtained by using two-dimensional Delaunay triangulation with respect to projection points obtained by projecting input points onto a reference plane, and a three-dimensional connection relationship of the input points is determined by applying the connection relationship of the projection points to the input points, it is possible to reduce a load of calculation, compared with a case in which three-dimensional Delaunay triangulation is used.

When a point present on a boundary surface is detected based on the gradient of luminance or density in the vicinity of a position specified by an input of instruction, it is possible to automatically move the position of the input point to an accurate position even if the input point that has been input by the user is not accurately located on the boundary surface.

In some cases, plural candidate planes, as candidates for the reference plane, are obtained, depending on the arrangement of input points. In such a case, if the plural candidate planes are displayed on a display device so that a user can select a plane from the plural candidate planes, it is possible to select the reference plane inclining in a direction close to the anatomical inclination of the boundary surface.

Further, in some cases, a candidate plane that inclines in a direction that is different from the original anatomical inclination of the boundary surface is obtained. In such a case, if the candidate plane is displayed on a display device, and the direction of the candidate plane is changeable, it is possible to correct the inclination of the candidate plane to a direction close to the anatomical inclination of the boundary surface, even if the arrangement of the input points is insufficient.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Figure 1:
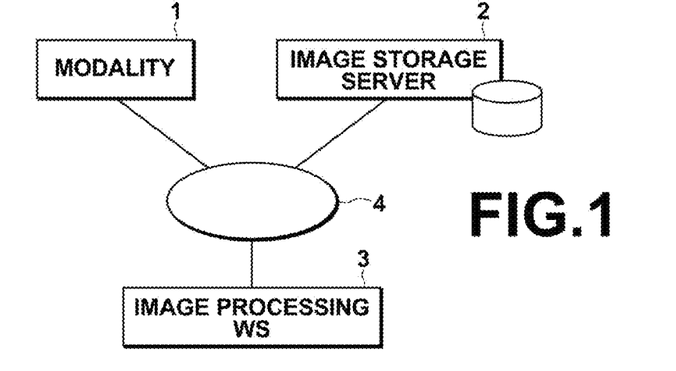
FIG. 1 is a schematic diagram illustrating the configuration of a medical system into which an image-based diagnosis assistance apparatus according to an embodiment of the present invention has been introduced.

Hereinafter, embodiments of an image-based diagnosis assistance apparatus according to the present invention will be described in detail with reference to drawings. FIG. 1 is a schematic diagram illustrating the configuration of a medical system including an image-based diagnosis assistance apparatus according to an embodiment of the present invention.

The medical system includes a modality 1, an image storage server 2, an image processing workstation 3, and a network 4 connecting each equipment.

The modality 1 includes an apparatus that generates image data representing a three-dimensional medical image of a subject (a region of a patient, as a target of diagnosis) by imaging the subject, and that outputs the image data, as medical image data, after attaching supplementary information defined by DICOM (Digital Imaging and Communications in Medicine) standard to the image data. Specific examples of the modality 1 are a CT apparatus, an MRI apparatus, and the like.

The image storage server 2 is a computer that stores, in an image database, the medical image data obtained by the modality 1 and image data on which image processing has been performed at the image processing workstation 3, and manages the medical image data and the image data. The image storage server 2 includes a large-capacity external storage device and software for managing the database. The three-dimensional medical image data obtained by imaging by the modality 1 are stored as volume data V.

The image processing workstation 3 has a known hardware configuration including a CPU, a main storage device, an auxiliary storage device, an input/output interface, a communication interface, an input device (a mouse, a keyboard, and the like), a display device (a display monitor), a data bus, or the like. Further, a known operating system or the like has been installed in the image processing workstation 3. Further, GUI (Graphical User Interface) is provided in the image processing workstation 3. Therefore, a user can use the GUI to obtain desired medical image data from the modality 1 and the image storage server 2, and to input various kinds of setting. Further, the image processing workstation 3 has a function of performing various kinds of image processing on the obtained medical image data, and displaying the generated image on a display device.

Further, when an image-based diagnosis assistance program is installed in the image processing workstation 3, image-based diagnosis assistance processing is provided at the image processing workstation 3. Accordingly, the image processing workstation 3 functions as the image-based diagnosis apparatus of the present invention. The image-based diagnosis program may be stored in a recording medium, such as a CD-ROM, or distributed through a network, such as the Internet, and installed in a computer.

The storage format of the medical image data and communication between apparatuses and devices through the network 4 are based on a protocol, such as DICOM.

Figure 2:
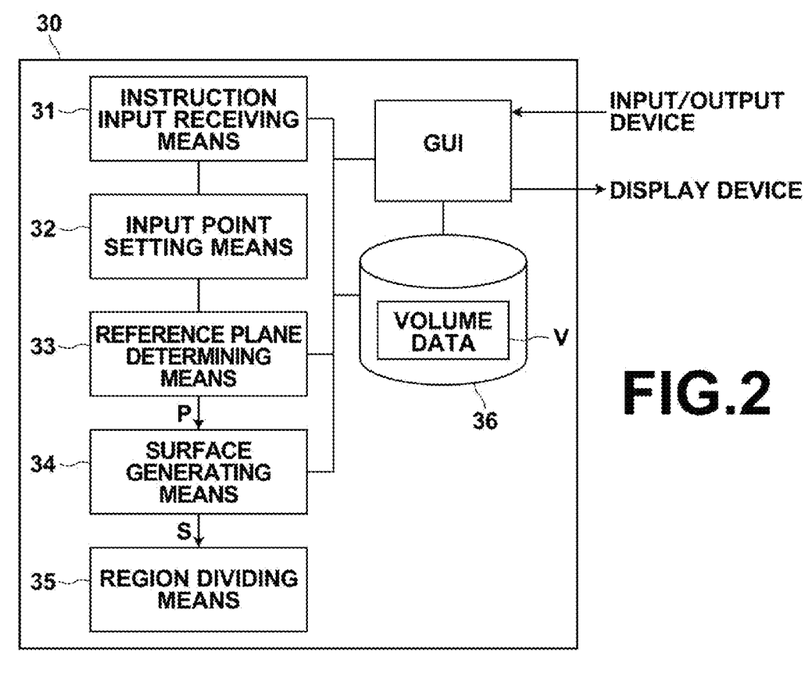
FIG. 2 is a block diagram illustrating the configuration of an image-based diagnosis assistance apparatus according to an embodiment of the present invention.

FIG. 2 is a block diagram illustrating a part of the function of the image processing workstation 3, and the part being related to an image-based diagnosis apparatus 30 according to an embodiment of the present invention. As illustrated in FIG. 2, the image-based diagnosis assistance apparatus 30 according to the embodiment of the present invention includes an instruction input receiving means 31, an input point setting means 32, a reference plane determining means 33, a surface generating means 34, a region dividing means 35, and a volume data storing means 36.

Figure 3:
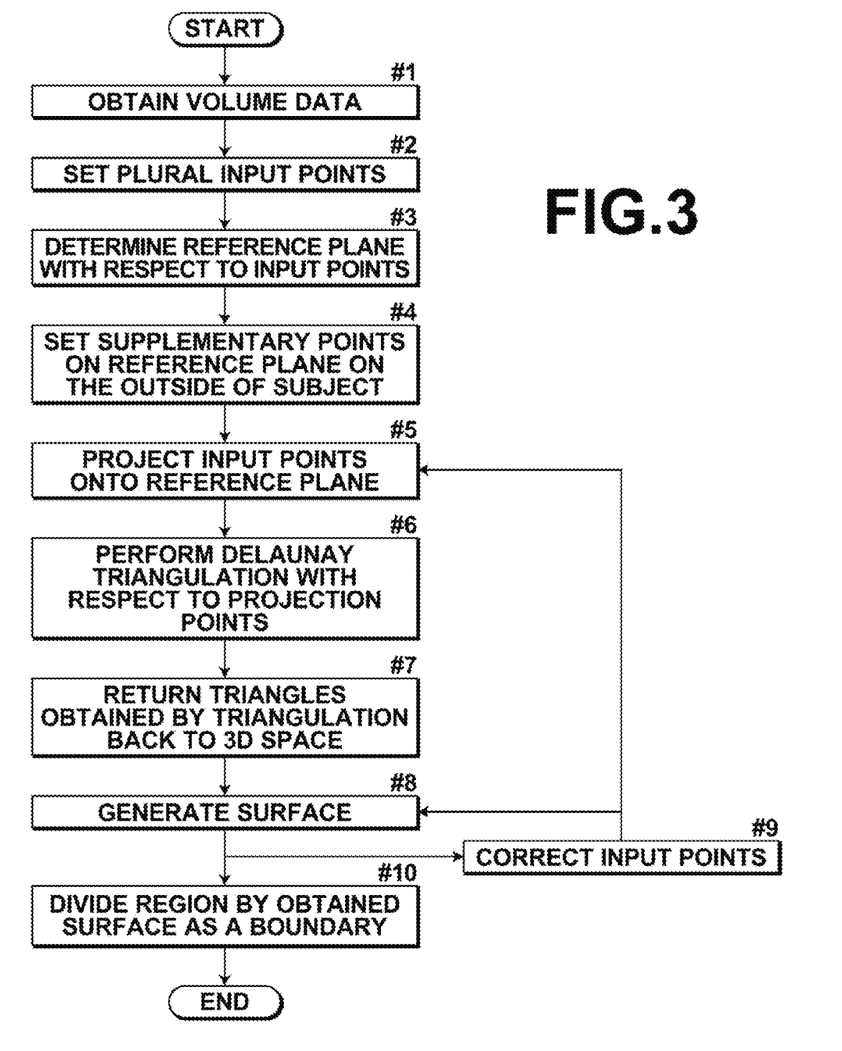
FIG. 3 is a flow chart of processing using an image-based diagnosis assistance apparatus according to an embodiment of the present invention.

FIG. 3 is a flow chart of image-based diagnosis assistance processing according to an embodiment of the present invention. With reference to FIGS. 2 and 3, the flow of image-based diagnosis assistance processing according to the embodiment of the present invention will be described. In this embodiment, a case in which a subject is divided by a diaphragm, as a boundary surface, will be described.

First, when the image processing workstation 3 requests volume data V obtained by imaging a thoracoabdominal region of a patient, as a target of diagnosis, the volume data V about the target of diagnosis are obtained from the image storage server 2 by image retrieval/obtainment processing by a known image retrieval system or a known ordering system. The obtained volume data V are temporarily stored in the volume data storing means 36 in the image processing workstation 3 (step S01).

Next, the volume data V are displayed on a display screen of a display device by using the instruction input receiving means 31 of the image processing workstation 3. Further, the user inputs (specifies) plural points on a boundary surface by using GUI. For example, a two-dimensional tomographic image (slice image), such as an axial image, a sagittal image and a coronal image, is displayed on the display device. Further, points on a diaphragm are specified by using a pointing device, such as a mouse. The points on the diaphragm are specified in plural two-dimensional tomographic images, while the displayed two-dimensional tomographic images are switched from each other. The points are specified in such a manner that they are substantially evenly arranged on the whole diaphragm (step S02).

The input point setting means 32 sets the specified points as input points. However, when a point is specified by using a mouse or the like, an accurate point on a diaphragm is not always specified. Therefore, the gradient of luminance or density in an image in the vicinity of an input point (specifically, a small range with the specified point as a center) may be calculated to detect a part that is likely to be the diaphragm. Further, the input point may be corrected to a point on the diaphragm, and set as the input point.

When a reference plane is calculated as described below, if the input points are unevenly arranged, a reference plane inclining in an unintended direction is often obtained. Therefore, when the input point setting means 32 sets input points, it is desirable to further perform processing for automatically selecting points from the points specified by the instruction input receiving means 31 so that plural input points are not arranged close to each other. Alternatively, processing of regarding, as one input point, plural input points located close to each other may be further performed.

Figure 4:
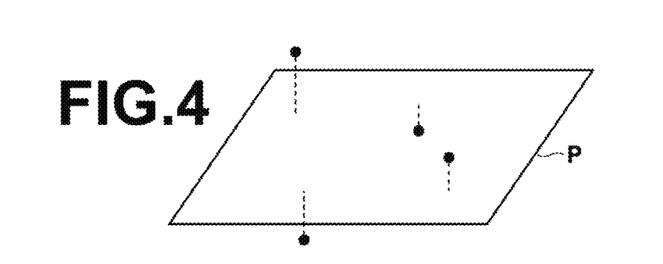
FIG. 4 is a diagram for explaining a method for obtaining, based on input points, a reference plane approximating a boundary surface.

Next, as illustrated in FIG. 4, the reference plane determining means 33 determines, as a reference plane approximating the diaphragm, a plane inclining substantially in the inclination of the diaphragm based on input points (●). Specifically, the direction of a normal vector of the reference plane is obtained by performing a principle component analysis (PCA) on the input points. Further, a regression plane, the least square of a distance from which to each of the input points becomes minimum, is determined as reference plane P (step S03).

As the direction of the normal vector of the reference plane P, the direction of an eigenvector when a sufficiently small eigenvalue is obtained by performing principle component analysis on input points is determined. However, two or more eigenvectors having sufficiently small eigenvalues are obtained in some cases, depending on the arrangement of the input points. In such a case, two or more candidate planes, as the candidates of the reference plane P, are present. Meanwhile, the anatomical inclination of the diaphragm is substantially determined, and candidate planes of eigenvectors having sufficiently small eigenvalues include a candidate plane the inclination of which is closer to the anatomical inclination of the diaphragm than a candidate plane of an eigenvector the eigenvalue of which is smallest. Therefore, the reference plane determining means 33 provides GUI that can select, from plural candidate planes, a plane the inclination of which is close to anatomical inclination.

Figure 5:
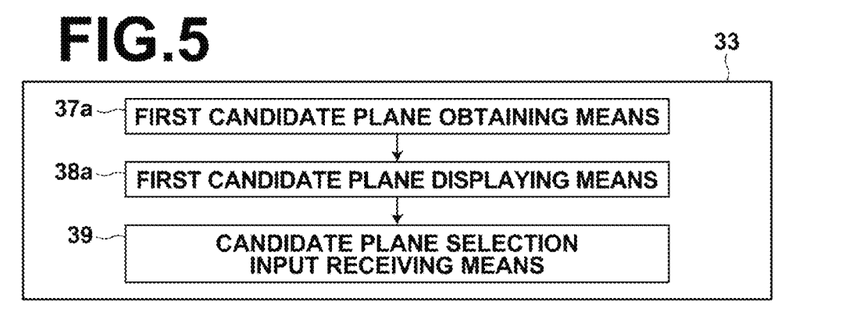
FIG. 5 is a block diagram illustrating the configuration of a reference plane determining means for selecting a candidate plane.

FIG. 5 is a block diagram related to candidate plane selection by the reference plane determining means 33. The reference plane determining means 33 includes a first candidate plane obtaining means 37*a*, a first candidate plane displaying means 38*a*, and a candidate plane selection input receiving means 39.

First, the first candidate plane obtaining means 37*a* obtains, as candidate planes, plural planes the normal vectors of which are eigenvectors having sufficiently small eigenvalues obtained by performing principle component analysis on input points.

Figure 6:
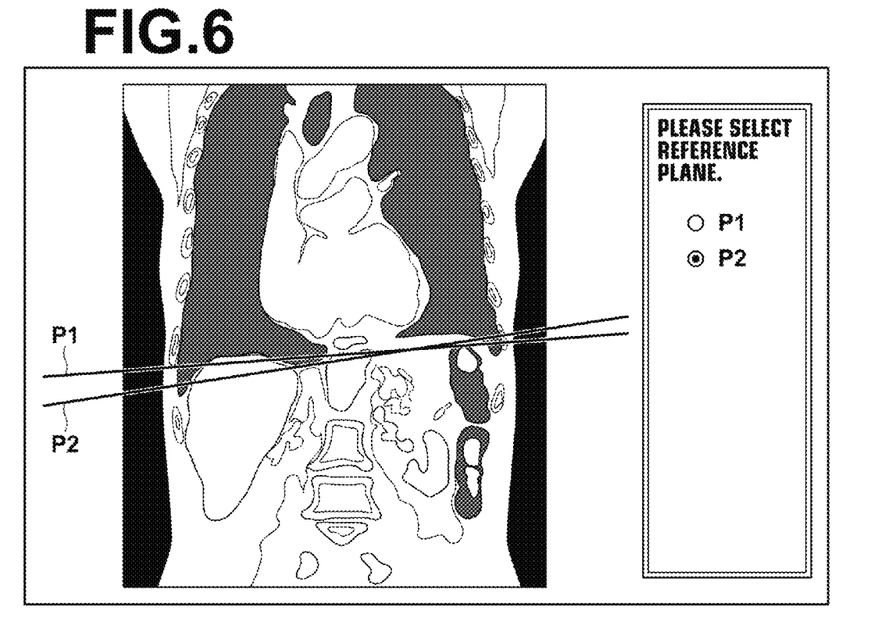
FIG. 6 is a diagram illustrating an example of a display screen for making a user select a reference plane from plural candidate planes.

Next, the first candidate plane displaying means 38*a* displays the plural candidate planes obtained by the first candidate plane obtaining means 37*a* on the display device. FIG. 6 is a diagram illustrating an example of a display screen. Plural candidate planes P1, P2 are displayed in such a manner that they are superposed on the diaphragm. The plural candidate planes P1, P2 are displayed in such a manner that a user can select one of the plural candidate planes P1, P2 (please refer to the right frame in FIG. 6). FIG. 6 illustrates the candidate planes two-dimensionally for convenience reasons. However, it is desirable that the candidate planes are displayed three-dimensionally so that the three-dimensional directions of the candidate planes are recognized.

The candidate plane selection input receiving means 39 receives an input of a candidate plane selected from the plural candidate planes by the user. The user selects the candidate plane from the plural candidate planes displayed, by the first candidate plane display means 38*a*, on the display device by an operation using an input device at the image processing workstation 3. The reference plane determining means 33 determines, as the reference plane P, the candidate plane selected and input by the candidate plane selection input receiving means 39.

In contrast, when only one eigenvector having a sufficiently small eigenvalue is obtained by performing principle component analysis, a candidate plane the direction of the normal vector of which is the eigenvector is determined as the reference plane. However, the inclination of the candidate plane is slightly different from the anatomical inclination of the diaphragm in some cases, depending on the arrangement of the input points. The reference plane determining means 33 provides GUI that can change the inclination of the candidate plane in such a case.

Figure 7:
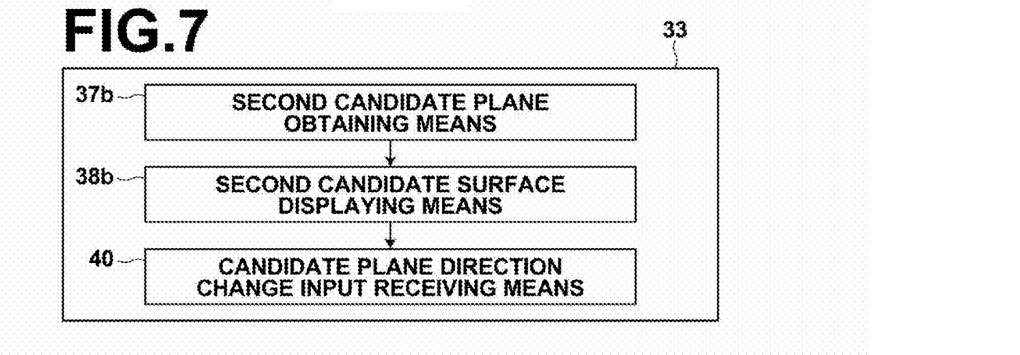
FIG. 7 is a block diagram illustrating the configuration of a reference plane determining means for changing the direction of a candidate plane.

FIG. 7 is a block diagram related to an operation of changing the direction of a candidate plane by the reference plane determining means 33. The reference plane determining means 33 includes a second candidate obtaining means 37*b*, a second candidate plane displaying means 38*b*, and a candidate plane direction change input receiving means 40.

First, the second candidate plane obtaining means 37 obtains, as a candidate plane of the reference plane P, a plane the normal vector of which is an eigenvector having a smallest eigenvalue obtained by performing principle component analysis on input points.

Figure 8:
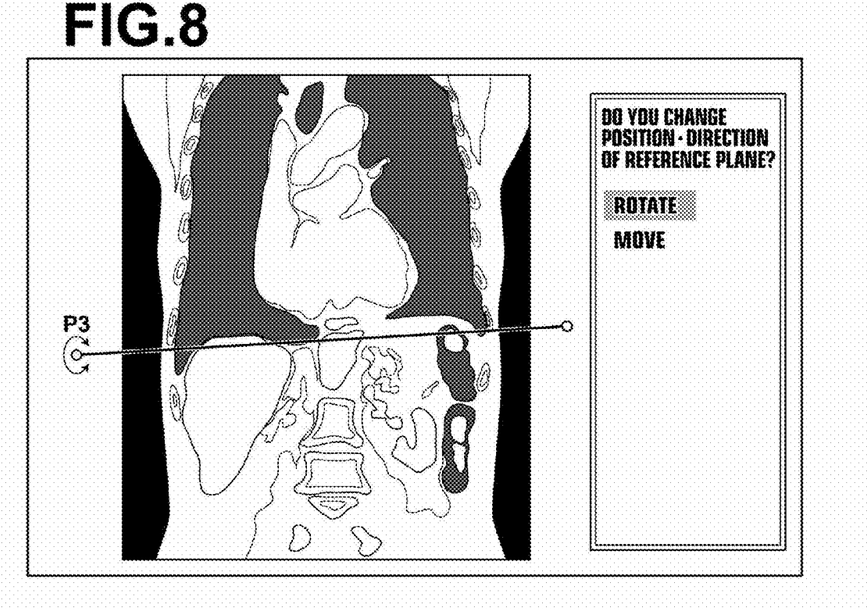
FIG. 8 is a diagram illustrating an example of a display screen for changing the direction of a candidate plane.

The second candidate plane displaying means 38*b* displays the candidate plane obtained by the second candidate plane obtaining means 37*b* on the display device. FIG. 8 is a diagram illustrating an example of a display screen. The candidate plane is displayed in such a manner that a user can change the direction of candidate plane P3. Further, the position of the candidate plane P3 may be moved vertically and horizontally by the user. In the example illustrated in FIG. 8, when "ROTATE" is selected, the candidate plane P3 is rotated with respect to end points of the candidate plane P3. Accordingly, it is possible to change the direction of the candidate plane P3. When "MOVE" is selected, it is possible to move the candidate plane P3 vertically and horizontally by dragging a mouse or the like. FIG. 8 illustrates the candidate plane P3 two-dimensionally for convenience reasons. However, it is desirable that the candidate plane P3 is displayed three-dimensionally so that the direction of the candidate plane P3 is changeable three-dimensionally.

Next, the candidate plane direction change input receiving means 40 receives the direction or position of the candidate plane that has been changed by an input operation by the user using the input device of the image processing workstation 3. The reference plane determining means 33 determines, as the reference plane P, the candidate plane the direction or position of which has been changed by the input at the candidate plane direction change input receiving means 40.

So far, cases in which a user selects reference plane P from candidate planes by using GUI, or determines, as the reference plane P, a candidate plate the direction of which has been changed by using GUI were described. However, since the anatomical inclination of a diaphragm is substantially determined, a plane the inclination of which is close to the anatomical inclination of a boundary surface may be automatically selected from plural candidate planes, and determined as the reference plane P. Alternatively, the direction of the candidate plane of the boundary surface may be determined in such a manner that the direction of the candidate plane is close to the anatomical inclination of the boundary surface.

A surface generating means 34 generates a surface approximating the boundary surface by interpolating points between the input points.

A subject is divided at the boundary surface by a region dividing means 35, which will be described later. Therefore, it is necessary to obtain a sufficiently large boundary surface so that the whole image is covered. Since the input points are set on the diaphragm in the subject, a boundary surface of a part of the subject located on the outside of the input points is not defined. Therefore, under the assumption that the boundary surface on the outside of the subject coincides with the reference plane P, four supplementary points (Δ) are set at four corners of a rectangle on the reference plane P on the outside of the subject (please refer to FIG. 9). The four points at the corners are sufficiently away from the input points. The supplementary points are set by recognizing a region in which the subject is present on the reference plane P, and by automatically setting a rectangle having a predetermined size with the subject placed at the center of the rectangle (step S04). Empirically, it is desirable that the length of a side of the rectangle is approximately 10 times as long as the thickness of the subject.

Figure 9:
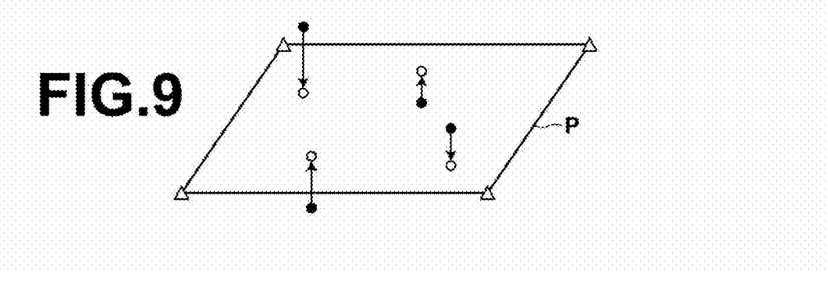
FIG. 9 is a diagram illustrating an example of projection points, which are obtained by projecting input points onto a reference plane, and supplementary points.

Next, connection relationships between the input points and the supplementary points are determined. To simplify processing, each input point (●) is temporarily projected onto the reference plane P, and the projection points (○) are set, as illustrated in FIG. 9 (step S05).

Figure 10:
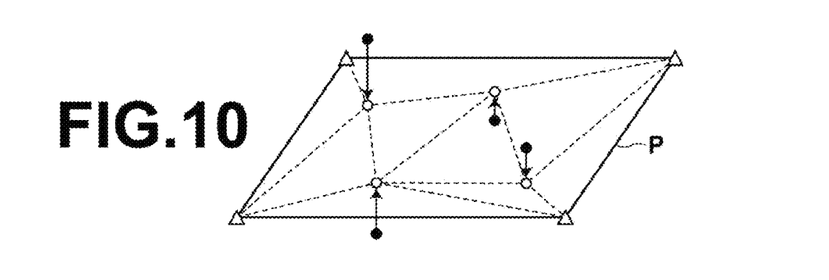
FIG. 10 is a diagram illustrating an example of triangles generated on a reference plane by triangulation.

Further, the four supplementary points set on the reference plane P are used as four corner points constituting a circumscribed rectangle in Delaunay triangulation, and two-dimensional Delaunay triangulation is performed on the supplementary points and the projection points. In this manner, connection relationships of the sides of triangles connecting the projection points to each other, or the projection point and the supplementary point to each other, or the supplementary points to each other are determined. FIG. 10 is a diagram illustrating an example of divided triangles generated by triangulation on the reference plane P (step S06).

Figure 11:
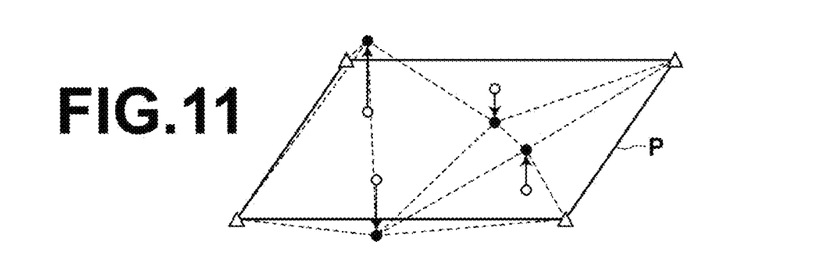
FIG. 11 is a diagram illustrating an example of a group of triangles generated in three-dimensional space when projection points are returned back to the positions of input points.

After the divided triangles are obtained on the reference plane P, while the connection relationships of the sides of triangles connecting the projection points to each other, or the projection point and the supplementary point to each other, or the supplementary points to each other are maintained, the connection relationships are applied to the input points, which are points before projection. Accordingly, a group of triangles connecting the input points to each other, the input points and the supplementary points to each other, and the supplementary points to each other is obtained in three-dimensional space. FIG. 11 is a diagram illustrating an example of a group of triangles connecting the input points and the supplementary points in the-dimensional space when the projection points are returned back to the positions of the input points (step S07).

In interpolation processing, which will be described next, a surface is generated by interpolating points between the input points based on the connection relationship between the input points. When an interpolated surface is generated by interpolating points between the input points and the supplementary points at four corners of the circumscribed rectangle, the interpolation reflects a change in the positions of input points present in the vicinity of a triangle including each of the supplementary points at the four corners of the circumscribed rectangle. Therefore, when the input points and the supplementary points at the four corners of the circumscribed rectangle are extremely away from each other, and triangles including the supplementary points at the four corners of the circumscribed triangle are extremely large, a surface that is distorted toward the outside of the subject is generated. Hence, for the purpose of making the boundary surface on the outside of the subject close or similar to the reference plane P, it is desirable that Delaunay triangulation is performed after plural supplementary points are added on the reference plane P on the outside of the subject. The supplementary points added on the reference plane P restrict the interpolated surface, and distortion of the surface toward the outside of the subject is suppressed. Specifically, points that divide sides of divided triangles connecting four corner points of the circumscribed triangle and the projected points, points that divide the sides of the circumscribed rectangle, and the like are automatically added as the supplementary points.

So far, the small calculation amount of two-dimensional processing has been considered, and Delaunay triangulation processing has been performed by projecting input points onto two-dimensional plane P. Instead of two-dimensionally projecting points, algorithm in which Delaunay triangulation is directly performed in three-dimensional space may be adopted.

Next, interpolation processing for generating an interpolated surface by interpolating points between input points and supplementary points based on the connection relationships between the input points and the supplementary points in three-dimensional space will be described.

Interpolation processing can generate a surface by using triangles obtained by subdividing a group of triangles connecting the supplementary points and the input points in three-dimensional space. Modified Butterfly scheme technique is applied to the group of triangles obtained by using the aforementioned technique, and each triangle is transformed into a group of subdivided triangles. Accordingly, a smooth surface is obtainable (please refer to non-patent document: D. Zorin et al., "Interpolating Subdivision for Meshes with Arbitrary Topology", SIGGRAPH '96 Proceedings of the $23^{rd}$ annual conference on Computer graphics and interactive techniques, for example).

Figure 12:
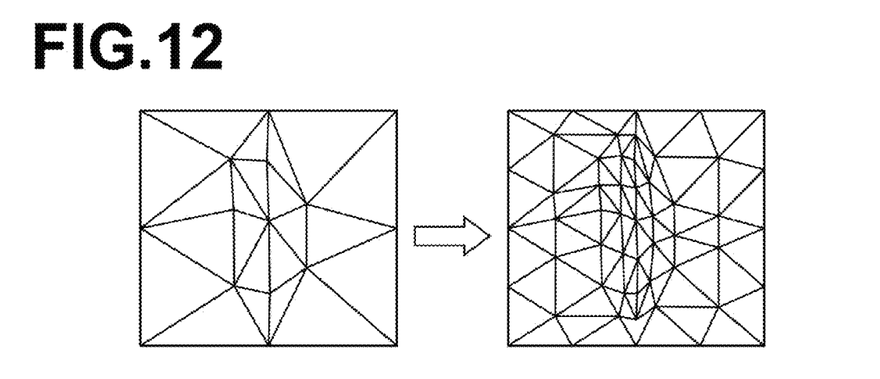
FIG. 12 is a diagram illustrating a manner of subdividing a group of triangles generated in three-dimensional space.

FIG. 12 is a diagram illustrating the manner of subdividing triangles. In the triangles illustrated on the left side of FIG. 12, a middle point of each side of the triangles is connected to each other to generate subdivided triangles illustrated on the right side of FIG. 12. The position of the middle point dividing each side is interpolated between the positions of points present in the vicinity of the middle point. When this processing is repeated, it is possible to generate a smooth surface in which points are interpolated between the input points and the supplementary points. Further, when the Modified Butterfly scheme technique is adopted, the generated surface always passes through each of the input points. Further, as a method for generating a subdivision surface by subdividing triangles, other methods, such as Catmull-Clark/Loop, may be used (step S08).

Alternatively, the surface may be generated by using various techniques for generating interpolated surface using NURBS surface, an implicit function, and the like based on the connection relationship between the input points and the supplementary points. In the modified Butterfly scheme, a surface that always passes through each of the input points is generated. However, whether the generated surface passes through the input points differs depending on the adopted technique. As well known, a surface that does not pass through the input points, but extends along a change in the input points may be generated.

Further, when the boundary surface does not need to be smooth, a group of triangles obtained by Delaunay triangulation may be directly adopted as the boundary surface, without generating a smooth surface, such as a subdivision surface generated by subdividing triangles.

Figure 13:
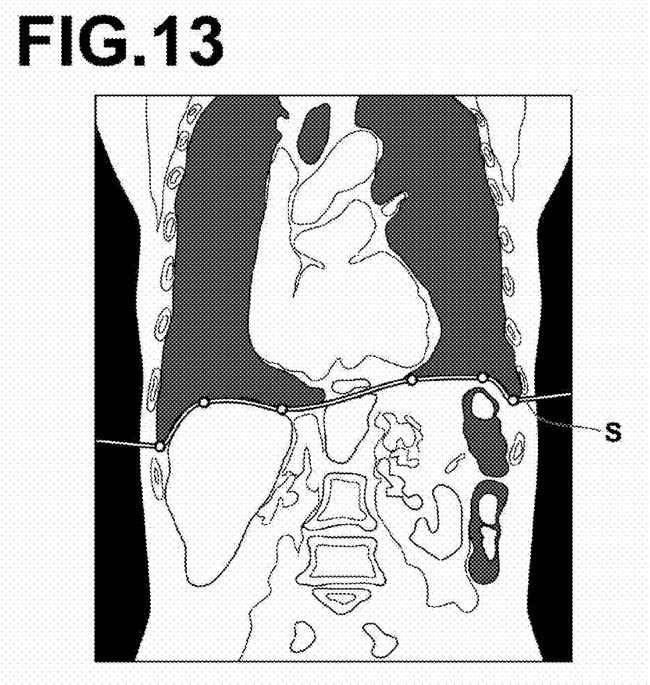
FIG. 13 is a diagram illustrating an example of a display screen in which a surface approximating a boundary surface and input points are displayed in such a manner to be superimposed on a tomographic image of a subject.

As illustrated in FIG. 13, surface S approximating the boundary surface, and which has been obtained through the aforementioned processing, is displayed on the display device in such a manner to be superposed on a tomographic image of the subject. Therefore, it is possible to check the section plane cut by the surface S before actual region division processing (region division means 35) is started. Since the surface S is generated to extend to distant positions of the displayed image, the surface S extends to an outside of a patient's body on the outside of the input points. To check the result, instead of simply displaying the surface S on the tomographic image, two divided regions maybe displayed in different colors from each other so that the result after section is clearly recognized. Alternatively, the two regions may be displayed in such a manner that one of the regions is not observable.

Figure 14:
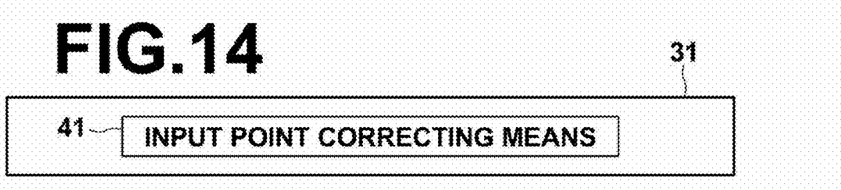
FIG. 14 is a block diagram illustrating the configuration of an instruction input receiving means.

Next, correction of a surface when the surface of a boundary surface is shifted from a diaphragm will be described. As illustrated in FIG. 14, the instruction input receiving means 31 includes an input point correction means 41 that provides GUI for correcting the boundary surface.

The input point correction means 41 provides a method for correcting surface S of the boundary surface by adding an input point or points, and a method for correcting surface S of the boundary surface by correcting the position of the input point that has been set already (step S09).

When an input point is added to correct the surface S, a two-dimensional cross-section is displayed, and a specified input point is added in a manner similar to the processing by the instruction input receiving means 31. However, when all of the steps in the aforementioned processing are performed again after the input point is added, the calculation amount increases, and an additional time is needed for processing. Further, in some cases, the direction of the reference plane P becomes undesirable, depending on the result of principle component analysis after adding the input point. Meanwhile, a possibility that the direction of the reference plane P has been already corrected to a desirable direction by a user is high. Therefore, when the input point is added, the reference plane P is not changed, and processing goes back to step S05 in FIG. 3. Further, the added input point is projected to generate a projection point, and calculation is performed again for the step of Delaunay triangulation and thereafter. Accordingly, a new surface S of the boundary surface is obtained.

As in the surface generated by Modified butterfly scheme, when the surface that always passes through each of the inputs points is generated, it is easier to correct the surface S by moving the input point or points. For example, as illustrated in FIG. 13, mark (point ◯) is added to the position of the input point on the generated surface S of the boundary surface, and the surface is displayed on the display device. Further, the mark of the input point is dragged by a mouse or the like to move the input point to an appropriate position.

When the surface S is corrected by moving the position of the input point in such a manner, it is not necessary to determine the connection relationship between the input points again. Therefore, it is not necessary to perform Delaunay triangulation. Processing may go back to step S08 in FIG. 3 without changing the connection relationship, and the step of generating the surface S and thereafter may be performed.

Correction as described above is repeated, and the surface S of the boundary surface is defined.

The region division means 35 divides a region into two parts by using the obtained surface S as the boundary surface.

For example, the region division means 35 judges, with respect to each voxel constituting volume data V, whether a straight line extending, in the direction of a normal vector of a regression plane, from the position of each of the voxels intersects the generated surface S. Further, the region division means 35 determines to which side of the boundary surface each voxel belongs. Accordingly, the region division means 35 divides the subject into two regions.

Alternatively, voxels on the surface S in volume data V may be used as boundary voxels, and a region growing method may be used to extract a region that does not straddle the boundary voxels. First, a voxel located at a certain position in the volume data V is specified as a point of interest. Then, whether the point of interest is a boundary voxel is checked. If the point of interest is not a boundary voxel, a mark is given to the voxel of the point of interest, and a voxel in the vicinity of the point of interest is used as a new point of interest. Then, whether the new point of interest is a boundary voxel is checked. This processing is repeated until no point of interest remains. Further, a part marked with the marks is extracted as a region on one side of the boundary surface. Specifically, the subject is divided into two regions by extending a region until a voxel reaches the boundary voxel, sequentially observing next voxels (step S10).

In the above descriptions, a case in which the boundary surface is a diaphragm has been described. However, it is not necessary that the boundary surface is the diaphragm. The present invention may be applied to extraction of a boundary surface dividing a lung into plural segments (a boundary surface dividing a right lung into a superior lobe, a middle lobe, and an inferior lobe, a boundary surface dividing a left lung into a superior lobe and an inferior lobe, and the like). Other examples of the "boundary surface" are a boundary surface dividing a liver into plural segments (a boundary surface dividing the whole liver into a right lobe and a left lobe, a boundary surface dividing the right lobe of the liver into an anterior segment and a posterior segment, a boundary surface dividing the right lobe of the liver into an upper segment and a lower segment, and the like), and a boundary surface dividing a heart into left/right atria and left/right ventricles, and the like. In this case, an organ, such as the lung, the liver, and the heart, is used as a subject, and the aforementioned technique is applied to specify plural points on a boundary surface of the organ, and surface S of the boundary surface dividing the organ is generated.

Further, in the descriptions about the instruction input receiving means 31, a case of displaying a two-dimensional tomographic image, and setting input points on the boundary surface was described. However, when a position on the surface of an organ, such as the lung, the heart and the liver, is specified, a volume rendering image of the organ may be displayed. Further, points on the boundary surface dividing the heart or the liver into segments may be set, while the image in the display screen is rotated.

With respect to the liver, a boundary surface dividing the liver into plural segments is determined based on blood vessels running through the liver. Therefore, the input point setting means 32 may extract blood vessels based on density values in the vicinity of the specified point, and detect center lines of the blood vessels or the like. Further, the input points may be corrected and set based on the detection result.

The anatomical direction of a boundary surface dividing an organ, such as a lung, a heart and a liver, into plural segments is determined. Therefore, when the reference plane determining means 33 determines a reference plane, a tissue boundary on which the input points specified by the user are arranged may be automatically identified based on the positions of the input points. Further, processing of making a user select a desirable direction based on the recognition result may be further provided.

What is claimed is:

1. An image-based diagnosis assistance apparatus comprising:
   an input point setting means that sets, as input points, a plurality of points present on a boundary surface dividing a predetermined subject in volume data obtained by imaging the predetermined subject;
   a reference plane determining means that determines, as a reference plane, a plane approximating the boundary surface by using the plurality of input points;
   a surface generating means that generates a surface approximating the boundary surface by setting a plurality of supplementary points on the reference plane on the outside of the predetermined subject, and by interpolating points between the input points by using the plurality of supplementary points and the input points; and
   a region dividing means that divides the predetermined subject into separate regions by using the generated surface as a boundary surface.

2. An image-based diagnosis assistance apparatus, as defined in claim 1, wherein the reference plane determining means determines, as the reference plane, a regression plane with respect to the input points.

3. An image-based diagnosis assistance apparatus, as defined in claim 1, wherein the surface generating means generates the surface by interpolating the points by Delaunay triangulation using the plurality of supplementary points and the input points.

4. An image-based diagnosis assistance apparatus, as defined in claim 3, wherein the surface generating means generates the surface by determining sides, each connecting projection points obtained by projecting the input points onto the reference plane, by using two-dimensional Delaunay triangulation with respect to the projection points, and by determining sides, each connecting the input points, by applying, to the input points, a connection relationship of the sides connecting the projection points.

5. An image-based diagnosis assistance apparatus, as defined in claim 1, the apparatus further comprising:
   an instruction input receiving means that receives an input of instruction specifying a predetermined position in the volume data,
   wherein the input point setting means sets, as one of the input points, a point present on the boundary surface by detecting the point based on the gradient of luminance or density in the vicinity of the predetermined position specified by the input of instruction.

6. An image-based diagnosis assistance apparatus, as defined in claim 1, wherein the reference plane determining means includes a first candidate plane obtaining means that obtains, based on the input points, a plurality of candidate planes as candidates for the reference plane, and a first candidate plane displaying means that displays the plurality of candidate planes on a display device, and a candidate plane selection input receiving means that receives an input of a candidate plane selected from the displayed plurality of candidate planes, and
   wherein the reference plane determining means determines, as the reference plane, the selected candidate plane.

7. An image-based diagnosis assistance apparatus, as defined in claim 1, wherein the reference plane determining means includes a second candidate plane obtaining means that obtains, based on the input points, a candidate plane as a candidate for the reference plane, and a second candidate plane displaying means that displays the candidate plane on a display device, and a candidate plane direction change input receiving means that receives an input of change in the direction of the displayed candidate plane, and
   wherein the reference plane determining means determines, as the reference plane, the candidate plane the direction of which has been changed.

8. An image-based diagnosis assistance apparatus, as defined in claim 1, wherein the volume data represent a medical image.

9. An operation method of an image-based diagnosis assistance apparatus that includes:
   an input point setting means that sets input points in volume data obtained by imaging a predetermined subject;
   a reference plane determining means that determines a reference plane;
   a surface generating means that generates a surface by interpolating points between the input points; and
   a region dividing means that divides the predetermined subject into a plurality of regions, the method comprising:
   an input point setting step of setting, by the input point setting means, a plurality of points present on a boundary surface dividing the predetermined subject in the volume data, as the input points;
   a reference plane determining step of determining, by the reference plane determining means, a plane approximating the boundary surface by using the plurality of input points, as the reference plane;
   a surface generating step of generating, by the surface generating means, the surface that approximates the boundary surface by setting a plurality of supplementary points on the reference plane on the outside of the predetermined subject, and by interpolating the points by using the plurality of supplementary points and the input points; and
   a region dividing step of dividing, by the region dividing means, the predetermined subject into the plurality of separate regions by using the generated surface as a boundary surface.

10. A non-transitory computer-readable recording medium storing therein an image-based diagnosis assistance program for causing a computer to function as:
- an input point setting means that sets, as input points, a plurality of points present on a boundary surface dividing a predetermined subject in volume data obtained by imaging the predetermined subject;
- a reference plane determining means that determines, as a reference plane, a plane approximating the boundary surface by using the plurality of input points;
- a surface generating means that generates a surface approximating the boundary surface by setting a plurality of supplementary points on the reference plane on the outside of the predetermined subject, and by interpolating points between the input points by using the plurality of supplementary points and the input points; and
- a region dividing means that divides the predetermined subject into separate regions by using the generated surface as a boundary surface.

* * * * *